(12) United States Patent
Ansari et al.

(10) Patent No.: US 11,850,975 B2
(45) Date of Patent: Dec. 26, 2023

(54) VEHICLE SEAT RECLINER MECHANISM WITH WELDED SPRING

(71) Applicant: Fisher & Company, Incorporated, St. Clair Shores, MI (US)

(72) Inventors: Anwer Ashab Ansari, St. Clair Shores, MI (US); Sapan M. Poptani, Northville, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 29 days.

(21) Appl. No.: 17/824,027

(22) Filed: May 25, 2022

(65) Prior Publication Data

US 2022/0396181 A1   Dec. 15, 2022

Related U.S. Application Data

(60) Provisional application No. 63/209,432, filed on Jun. 11, 2021.

(51) Int. Cl.
   *B60N 2/235*   (2006.01)
   *B60N 2/225*   (2006.01)

(52) U.S. Cl.
   CPC ......... *B60N 2/2356* (2013.01); *B60N 2/2255* (2013.01); *B60N 2/236* (2015.04)

(58) Field of Classification Search
   CPC ..... B60N 2/2356; B60N 2/2255; B60N 2/236
   USPC ............................................. 297/367 P, 367 L
   See application file for complete search history.

(56) References Cited

U.S. PATENT DOCUMENTS

| 3,736,026 A | 5/1973 | Ziegler et al. |
| 3,953,069 A | 4/1976 | Tamura et al. |
| 4,219,234 A | 8/1980 | Bell |
| 4,243,264 A | 1/1981 | Bell |

(Continued)

FOREIGN PATENT DOCUMENTS

| CA | 2369034 A1 | 7/2002 |
| CA | 2759299 A1 | 12/2011 |

(Continued)

OTHER PUBLICATIONS

Office Action regarding Canadian Patent Application No. 2,812,408, dated Jun. 17, 2016.

(Continued)

*Primary Examiner* — Milton Nelson, Jr.
(74) *Attorney, Agent, or Firm* — Harness, Dickey & Pierce, P.L.C.

(57) ABSTRACT

A recliner mechanism for a vehicle seat may include a guide plate, a locking plate, a pawl, an actuator hub, and a coil spring. The guide plate includes a recess and a projection. The locking plate includes a surface having teeth formed thereon. The pawl is movable in the recess between a secure position in which the pawl is engaged with the teeth of the locking plate to restrict relative rotation between the guide plate and the locking plate and a release position in which the pawl is disengaged from the teeth of the locking plate to allow relative rotation between the guide plate and the locking plate. Rotation of the actuator hub causes corresponding movement of the pawl between the secure position and the release position. The coil spring includes a first end engaging the actuator hub and a second end that hooks the projection of the guide plate.

20 Claims, 7 Drawing Sheets

(56) References Cited

U.S. PATENT DOCUMENTS

| | | |
|---|---|---|
| 4,279,442 A | 7/1981 | Bell |
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,709,053 B1 | 3/2004 | Humer et al. |
| 6,740,845 B2 | 5/2004 | Stol et al. |
| 6,758,525 B2 | 7/2004 | Uramichi |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,500,719 B2 | 3/2009 | Kojima |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,775,594 B2 | 8/2010 | Bruck et al. |
| 7,976,103 B2 | 7/2011 | Gamache et al. |
| 8,052,215 B2 | 11/2011 | Ito |
| 8,128,169 B2 | 3/2012 | Narita et al. |
| 8,360,527 B2 | 1/2013 | Lehmann |
| 8,430,454 B2 | 4/2013 | Tanguy et al. |
| 8,449,034 B2 | 5/2013 | Tame et al. |
| 8,845,019 B2 | 9/2014 | Sawada |
| 8,985,690 B2 | 3/2015 | Yamada et al. |
| 9,102,248 B2 | 8/2015 | Matt |
| 9,108,541 B2 | 8/2015 | Assmann et al. |
| 9,221,364 B2 | 12/2015 | Nock et al. |
| 9,227,532 B2 | 1/2016 | Balzar et al. |
| 9,296,315 B2 * | 3/2016 | Hellrung .............. B60N 2/236 |
| 9,475,409 B2 | 10/2016 | Jiang et al. |
| 9,527,410 B2 | 12/2016 | Leconte |
| 9,527,419 B2 | 12/2016 | Hosbach et al. |
| 9,555,725 B2 | 1/2017 | Rothstein et al. |
| 9,573,493 B2 | 2/2017 | Nagura et al. |
| 9,616,779 B2 | 4/2017 | Barzen et al. |
| 9,623,774 B2 | 4/2017 | Yamada et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 * | 2/2018 | Espinosa ............. B60N 2/2227 |
| 10,065,538 B2 | 9/2018 | Desquesne et al. |
| 10,150,387 B2 | 12/2018 | Hiemstra et al. |
| 10,279,709 B2 | 5/2019 | Suzuki et al. |
| 10,399,466 B2 | 9/2019 | Chang |
| 10,610,018 B1 * | 4/2020 | Madhu .................. A47C 1/027 |
| 10,787,098 B2 | 9/2020 | Smuk |
| 10,800,296 B2 | 10/2020 | Schmitz et al. |
| 10,864,830 B2 | 12/2020 | Schmitz et al. |
| 11,052,797 B2 | 7/2021 | Poptani et al. |
| 2002/0043852 A1 | 4/2002 | Uramichi |
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0134055 A1 | 7/2004 | Aizaki |
| 2004/0145226 A1 | 7/2004 | Bonk |
| 2004/0195889 A1 | 10/2004 | Secord |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |
| 2007/0138854 A1 | 6/2007 | Paing et al. |
| 2007/0145800 A1 | 6/2007 | Thiel et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0001797 A1 | 1/2009 | Neumann |
| 2009/0056124 A1 | 3/2009 | Krebs et al. |

(56) References Cited

U.S. PATENT DOCUMENTS

| | | |
|---|---|---|
| 2009/0072602 A1 | 3/2009 | Schuler |
| 2009/0250989 A1* | 10/2009 | Endo .................... B60N 2/236 297/367 P |
| 2010/0072802 A1 | 3/2010 | Smith et al. |
| 2010/0096892 A1 | 4/2010 | Meghira et al. |
| 2010/0096896 A1 | 4/2010 | Nonomiya |
| 2010/0176621 A1 | 7/2010 | Aufrere et al. |
| 2010/0231021 A1 | 9/2010 | Myers et al. |
| 2010/0283304 A1 | 11/2010 | Thiel |
| 2010/0308634 A1 | 12/2010 | Narita et al. |
| 2010/0308635 A1 | 12/2010 | Tame et al. |
| 2010/0320823 A1 | 12/2010 | Thiel |
| 2011/0025114 A1* | 2/2011 | Berndtson ............... B60N 2/236 297/367 P |
| 2011/0068612 A1 | 3/2011 | Thiel |
| 2011/0127814 A1 | 6/2011 | Thiel |
| 2011/0169314 A1 | 7/2011 | Tanguy et al. |
| 2011/0227386 A1 | 9/2011 | Berndtson et al. |
| 2011/0309665 A1 | 12/2011 | Leighton et al. |
| 2012/0086253 A1 | 4/2012 | Nock et al. |
| 2012/0169102 A1 | 7/2012 | Hiemstra et al. |
| 2012/0248841 A1 | 10/2012 | Hellrung et al. |
| 2012/0313415 A1 | 12/2012 | Nonomiya et al. |
| 2013/0161995 A1 | 6/2013 | Yamada et al. |
| 2013/0207434 A1 | 8/2013 | Stilleke et al. |
| 2013/0270884 A1 | 10/2013 | Espinosa et al. |
| 2014/0001806 A1 | 1/2014 | Golarz |
| 2014/0008956 A1 | 1/2014 | Golarz et al. |
| 2014/0008958 A1 | 1/2014 | Ito |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0225411 A1 | 8/2014 | Matt |
| 2014/0239691 A1 | 8/2014 | Hellrung |
| 2014/0301682 A1 | 10/2014 | Leppla |
| 2015/0015044 A1 | 1/2015 | Teufel et al. |
| 2015/0042133 A1 | 2/2015 | Munemura et al. |
| 2015/0069809 A1 | 3/2015 | Matt |
| 2015/0091346 A1 | 4/2015 | Kitou |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1 | 11/2015 | McCulloch et al. |
| 2016/0023577 A1 | 1/2016 | Yamada et al. |
| 2016/0107546 A1 | 4/2016 | Barzen et al. |
| 2016/0272089 A1 | 9/2016 | Kim et al. |
| 2016/0339810 A1 | 11/2016 | Pluta et al. |
| 2017/0021743 A1 | 1/2017 | Hiemstra et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2017/0253152 A1 | 9/2017 | Maeda et al. |
| 2018/0043800 A1 | 2/2018 | Maeda et al. |
| 2018/0056819 A1 | 3/2018 | Schmitz et al. |
| 2018/0103760 A1 | 4/2018 | Fujita et al. |
| 2018/0154802 A1 | 6/2018 | Ito |
| 2018/0208087 A1 | 7/2018 | Baba et al. |
| 2018/0339613 A1 | 11/2018 | Mizobata |
| 2018/0361886 A1* | 12/2018 | Chang ................... B60N 2/2356 |
| 2019/0255979 A1 | 8/2019 | Zahn et al. |
| 2019/0299821 A1 | 10/2019 | Maeda et al. |
| 2019/0329674 A1 | 10/2019 | Schmitz et al. |
| 2019/0337424 A1 | 11/2019 | Chang |
| 2019/0358694 A1 | 11/2019 | Yamakita |
| 2020/0047644 A1 | 2/2020 | Schmitz et al. |
| 2020/0070689 A1 | 3/2020 | Naik et al. |
| 2020/0164775 A1 | 5/2020 | Chang |
| 2020/0253380 A1 | 8/2020 | Schmitz et al. |
| 2020/0282879 A1 | 9/2020 | Schmitz et al. |
| 2020/0331367 A1 | 10/2020 | Schmitz et al. |
| 2021/0039528 A1* | 2/2021 | Poptani ................. B60N 2/2356 |
| 2021/0061139 A1 | 3/2021 | Schmitz et al. |
| 2021/0276461 A1 | 9/2021 | Schmitz et al. |

FOREIGN PATENT DOCUMENTS

| | | |
|---|---|---|
| CA | 2869816 A1 | 10/2013 |
| CN | 1291566 A | 4/2001 |
| CN | 1457306 A | 11/2003 |
| CN | 1840382 A | 10/2006 |
| CN | 101148152 A | 3/2008 |
| CN | 101616820 A | 12/2009 |
| CN | 101925485 A | 12/2010 |
| CN | 102126451 A | 7/2011 |
| CN | 102131673 A | 7/2011 |
| CN | 202086037 U | 12/2011 |
| CN | 102442228 A | 5/2012 |
| CN | 103025568 A | 4/2013 |
| CN | 103298652 A | 9/2013 |
| CN | 203228664 U | 10/2013 |
| CN | 203381519 U | 1/2014 |
| CN | 103702860 A | 4/2014 |
| CN | 103857314 A | 6/2014 |
| CN | 203974603 U | 12/2014 |
| CN | 105189196 A | 12/2015 |
| CN | 205097989 U | 3/2016 |
| CN | 205130981 U | 4/2016 |
| CN | 106799978 A | 6/2017 |
| CN | 107364369 A | 11/2017 |
| CN | 107428269 A | 12/2017 |
| CN | 107972542 A | 5/2018 |
| CN | 207291755 U | 5/2018 |
| CN | 108263253 A | 7/2018 |
| CN | 109515263 A | 3/2019 |
| CN | 109562707 A | 4/2019 |
| CN | 112339625 A | 2/2021 |
| DE | 907608 C | 3/1954 |
| DE | 1098292 B | 1/1961 |
| DE | 4324734 A1 | 1/1995 |
| DE | 20220200 U1 | 2/2004 |
| DE | 102007002366 B3 | 7/2008 |
| DE | 102008026176 A1 | 12/2009 |
| DE | 102008029438 A1 | 12/2009 |
| DE | 102010038795 A1 | 2/2012 |
| DE | 102011013163 A1 | 9/2012 |
| DE | 102012009159 A1 | 11/2012 |
| DE | 102011108976 A1 | 1/2013 |
| DE | 102012008940 A1 | 11/2013 |
| DE | 112014000343 T5 | 9/2015 |
| DE | 102017100374 A1 | 7/2017 |
| DE | 202018107311 U1 | 2/2019 |
| EP | 1074426 A2 | 2/2001 |
| GB | 1136097 A | 12/1968 |
| GB | 1546104 A | 5/1979 |
| GB | 2441871 A | 3/2008 |
| JP | 2000084684 A | 3/2000 |
| JP | 2000153327 A | 6/2000 |
| JP | 2001186957 A | 7/2001 |
| JP | 2002119349 A | 4/2002 |
| JP | 5290789 B2 | 9/2013 |
| JP | 5555969 B2 | 7/2014 |
| KR | 20030092869 A | 12/2003 |
| KR | 100601809 B1 | 7/2006 |
| KR | 20070119332 A | 12/2007 |
| KR | 100817000 B1 | 3/2008 |
| KR | 20090035633 A | 4/2009 |
| KR | 20140061651 A | 1/2014 |
| KR | 101420164 B1 | 7/2014 |
| KR | 101655777 B1 | 9/2016 |
| WO | 9620848 A1 | 7/1996 |
| WO | 2006069630 A2 | 7/2006 |
| WO | 2011069107 A2 | 6/2011 |
| WO | 2013133245 A1 | 9/2013 |
| WO | 2013152433 A1 | 10/2013 |
| WO | 2013167240 A1 | 11/2013 |
| WO | 2015012287 A1 | 1/2015 |
| WO | 2016115986 A1 | 7/2016 |

(56) References Cited

FOREIGN PATENT DOCUMENTS

| WO | 2017118496 A1 | 7/2017 |
|---|---|---|
| WO | 2021020580 A1 | 2/2021 |

OTHER PUBLICATIONS

Office Action regarding German Patent Application No. 102016114406.1, dated Apr. 22, 2020. Translation provided by Witte, Weller & Partner Patentanwälte mbB.

International Search Report regarding International Application No. PCT/US2020/021377, dated Jun. 30, 2020.

Written Opinion of the International Searching Authority regarding International Application No. PCT/US2020/021377, dated Jun. 30, 2020.

Office Action regarding German Patent Application No. 102020208717.2, dated Feb. 16, 2021.

Office Action regarding German Patent Application No. 102019211855.0, dated Feb. 4, 2021. Partial translation provided by Bardehle Pagenberg Partnerschaft mbB.

SPI Lasers UK Ltd., "Opening new possibilities with single mode oscillation welding (CW)." Presented at: Laser World of Photonics China; Shanghai, China (Mar. 2008).

Office Action regarding German Patent Application No. 102019212517.4, dated Mar. 11, 2021. Partial translation provided by Bardehle Pagenberg Partnerschaft mbB.

Office Action regarding Indian Patent Application No. 201921032346, dated Mar. 18, 2021.

Office Action regarding Chinese Patent Application No. 201910334168.9, dated Apr. 30, 2021. Translation provided by Unitalen Attorneys at Law.

Office Action regarding German Patent Application No. 102013103671.6, dated May 20, 2021. Translation provided by Witte, Weller & Partner Patentanwälte mbB.

First Chinese Office Action regarding Application No. 201910801476.8 dated Aug. 10, 2021. English translation provided by Unitalen Attorneys at Law.

Office Action regarding U.S. Appl. No. 16/996,991, dated Sep. 9, 2021.

Notice of Allowance regarding U.S. Appl. No. 16/996,991, dated Oct. 4, 2021.

Office Action regarding U.S. Appl. No. 16/542,369, dated Jul. 16, 2021.

Non-Final Office Action regarding U.S. Appl. No. 16/542,369, dated May 17, 2021.

Notice of Allowance regarding U.S. Appl. No. 16/542,369, dated Oct. 5, 2021.

Office Action regarding U.S. Appl. No. 16/842,135, dated Sep. 16, 2021.

Office Action regarding U.S. Appl. No. 16/740,874, dated Apr. 26, 2021.

Office Action regarding U.S. Appl. No. 16/740,874, dated Aug. 16, 2021.

Office Action regarding U.S. Appl. No. 16/811,112, dated Sep. 3, 2021.

Office Action regarding German Application No. 102019110151.4, dated Jul. 12, 2021.

Office Action regarding German Patent Application No. 102020200559.1, dated Jul. 23, 2021.

Office Action regarding Chinese Patent Application No. 201910725351.1, dated Jul. 5, 2021.

Office Action regarding U.S. Appl. No. 16/740,874, dated Oct. 20, 2021.

Office Action regarding German Patent Application No. 10 2019 211 855.0, dated Nov. 3, 2021.

Office Action regarding Chinese Patent Application No. 202010082469.X, dated Dec. 7, 2021.

Office Action regarding Chinese Patent Application No. 201910801476.8, dated Dec. 17, 2021.

Office Action regarding Chinese Patent Application No. 202010305091.5, dated Jan. 27, 2022. Translation provided by Unitalen Attorneys at Law.

Non-Final Office Action regarding U.S. Appl. No. 17/181,189 dated May 19, 2022.

Office Action regarding German Patent Application 10 2020 204 814.2 dated Jun. 8, 2022.

Office Action regarding Chinese Patent Application No. 2020103050915, dated Jun. 23, 2022.

Office Action regarding Chinese Patent Application No. 2020107827129, dated Jun. 1, 2022.

Office Action regarding U.S. Appl. No. 16/842,135, dated Aug. 26, 2022.

German Office Action regarding Patent Application No. 1020161144061, dated Nov. 9, 2022.

Chinese Office Action regarding Patent Application No. 2021102452677, dated Oct. 28, 2022.

Chinese Office Action regarding Application No. 202010885551.6, dated Jul. 21, 2022.

Final Office Action regarding U.S. Appl. No. 16/842,135 dated Feb. 17, 2023.

Office Action regarding U.S. Appl. No. 17/720,609 dated May 17, 2023.

German Office Action regarding Patent Application No. 102022201243.7, dated May 12, 2023.

Non-Final Office Action regarding U.S. Appl. No. 16/842,135 dated May 26, 2023.

Notice of Allowance regarding U.S. Appl. No. 17/586,203, dated Jul. 26, 2023.

\* cited by examiner

VEHICLE SEAT RECLINER MECHANISM WITH WELDED SPRING

CROSS-REFERENCE TO RELATED APPLICATIONS

This application claims the benefit of U.S. Provisional Application No. 63/209,432, filed on Jun. 11, 2021. The entire disclosure of the above application is incorporated herein by reference.

FIELD

The present disclosure relates to a recliner mechanism for a vehicle seat, and more particularly, to a recliner mechanism with a welded spring.

BACKGROUND

This section provides background information related to the present disclosure and is not necessarily prior art.

Vehicle seats often include a recliner heart that can rotate a seatback relative to a seat bottom. A hand lever can be rotated to move the recliner heart between a locked position preventing relative rotation between the seatback and the seat bottom and an unlocked position permitting relative rotation between the seatback and the seat bottom. The present disclosure provides a spring that biases the hand lever and recliner heart toward the locked position. The spring is attached to the recliner heart in a manner that prevents disengagement of the spring during an impact event.

SUMMARY

This section provides a general summary of the disclosure, and is not a comprehensive disclosure of its full scope or all of its features.

In one form, the present disclosure provides a recliner mechanism for a vehicle seat. The recliner mechanism may include a guide plate, a locking plate, a pawl, an actuator hub, and a coil spring. The guide plate may include a recess and a projection. The recess may be formed in a first side of the guide plate and the projection may extend outward from a second side of the guide plate. The locking plate may include a surface having teeth formed thereon. The pawl is movable in the recess between a secure position in which the pawl is engaged with the teeth of the locking plate to restrict relative rotation between the guide plate and the locking plate and a release position in which the pawl is disengaged from the teeth of the locking plate to allow relative rotation between the guide plate and the locking plate. The actuator hub may extend through an aperture in the guide plate and may engage the pawl such that rotation of the actuator hub relative to the guide plate causes corresponding movement of the pawl between the secure position and the release position. The coil spring may surround the actuator hub and rotationally bias the actuator hub in a rotational direction that moves the pawl toward the secure position. The coil spring includes a first end engaging the actuator hub and a second end that hooks the projection of the guide plate. The second end is welded to the projection.

In some configurations of the recliner mechanism of the above paragraph, the second end of the coil spring extends outward from a coiled section of the coil spring.

In some configurations of the recliner mechanism of either of the above paragraphs, the first end of the coil spring extends radially inward from the coiled section.

In some configurations of the recliner mechanism of any of the above paragraphs, the first end of the coil spring is received in a slot in the actuator hub.

In some configurations of the recliner mechanism of any of the above paragraphs, the projection is integrally formed with the guide plate.

In some configurations of the recliner mechanism of any of the above paragraphs, the second end loops at least partially around the projection.

In some configurations of the recliner mechanism of any of the above paragraphs, the projection is a cylindrical post.

In some configurations of the recliner mechanism of any of the above paragraphs, the pawl is disposed between the guide plate and the locking plate. The coil spring is disposed on a side of the guide plate opposite the pawl.

In some configurations of the recliner mechanism of any of the above paragraphs, the actuator hub includes a radially extending latch that selectively engages a latch of the pawl to move the pawl into the release position.

In some configurations, the recliner mechanism of any of the above paragraphs may include a hand lever that drives the actuator hub. The coil spring is disposed between the hand lever and the guide plate.

In some configurations, the recliner mechanism of any of the above paragraphs may include an encapsulation ring encircling peripheries of the guide plate and the locking plate.

In another form, the present disclosure provides vehicle seat that may include a seat bottom, a seatback that is selectively rotatable relative to the seat bottom, and a recliner mechanism connected to the seat bottom and the seatback and movable between a locked position to prevent rotation of the seatback relative to the seat bottom and an unlocked position to allow rotation of the seatback relative to the seat bottom. The recliner mechanism may include a guide plate, a locking plate, a pawl, an actuator hub, and a coil spring. The guide plate may include a recess and a projection. The recess may be formed in a first side of the guide plate and the projection may extend outward from a second side of the guide plate. The locking plate may include a surface having teeth formed thereon. The pawl is movable in the recess between a secure position in which the pawl is engaged with the teeth of the locking plate to restrict relative rotation between the guide plate and the locking plate and a release position in which the pawl is disengaged from the teeth of the locking plate to allow relative rotation between the guide plate and the locking plate. The actuator hub may extend through an aperture in the guide plate and may engage the pawl such that rotation of the actuator hub relative to the guide plate causes corresponding movement of the pawl between the secure position and the release position. The coil spring may surround the actuator hub and rotationally bias the actuator hub in a rotational direction that moves the pawl toward the secure position. The coil spring includes a first end engaging the actuator hub and a second end that hooks the projection of the guide plate. The second end is welded to the projection.

In some configurations of the vehicle seat of the above paragraph, the second end of the coil spring extends outward from a coiled section of the coil spring.

In some configurations of the vehicle seat of either of the above paragraphs, the first end of the coil spring extends radially inward from the coiled section.

In some configurations of the vehicle seat of any of the above paragraphs, the first end of the coil spring is received in a slot in the actuator hub.

In some configurations of the vehicle seat of any of the above paragraphs, the projection is integrally formed with the guide plate.

In some configurations of the vehicle seat of any of the above paragraphs, the second end loops at least partially around the projection.

In some configurations of the vehicle seat of any of the above paragraphs, the projection is a cylindrical post.

In some configurations of the vehicle seat of any of the above paragraphs, the pawl is disposed between the guide plate and the locking plate. The coil spring is disposed on a side of the guide plate opposite the pawl.

In some configurations of the vehicle seat of any of the above paragraphs, the actuator hub includes a radially extending latch that selectively engages a latch of the pawl to move the pawl into the release position.

In some configurations, the vehicle seat of any of the above paragraphs may include a hand lever that drives the actuator hub. The coil spring is disposed between the hand lever and the guide plate.

In some configurations, the vehicle seat of any of the above paragraphs may include an encapsulation ring encircling peripheries of the guide plate and the locking plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
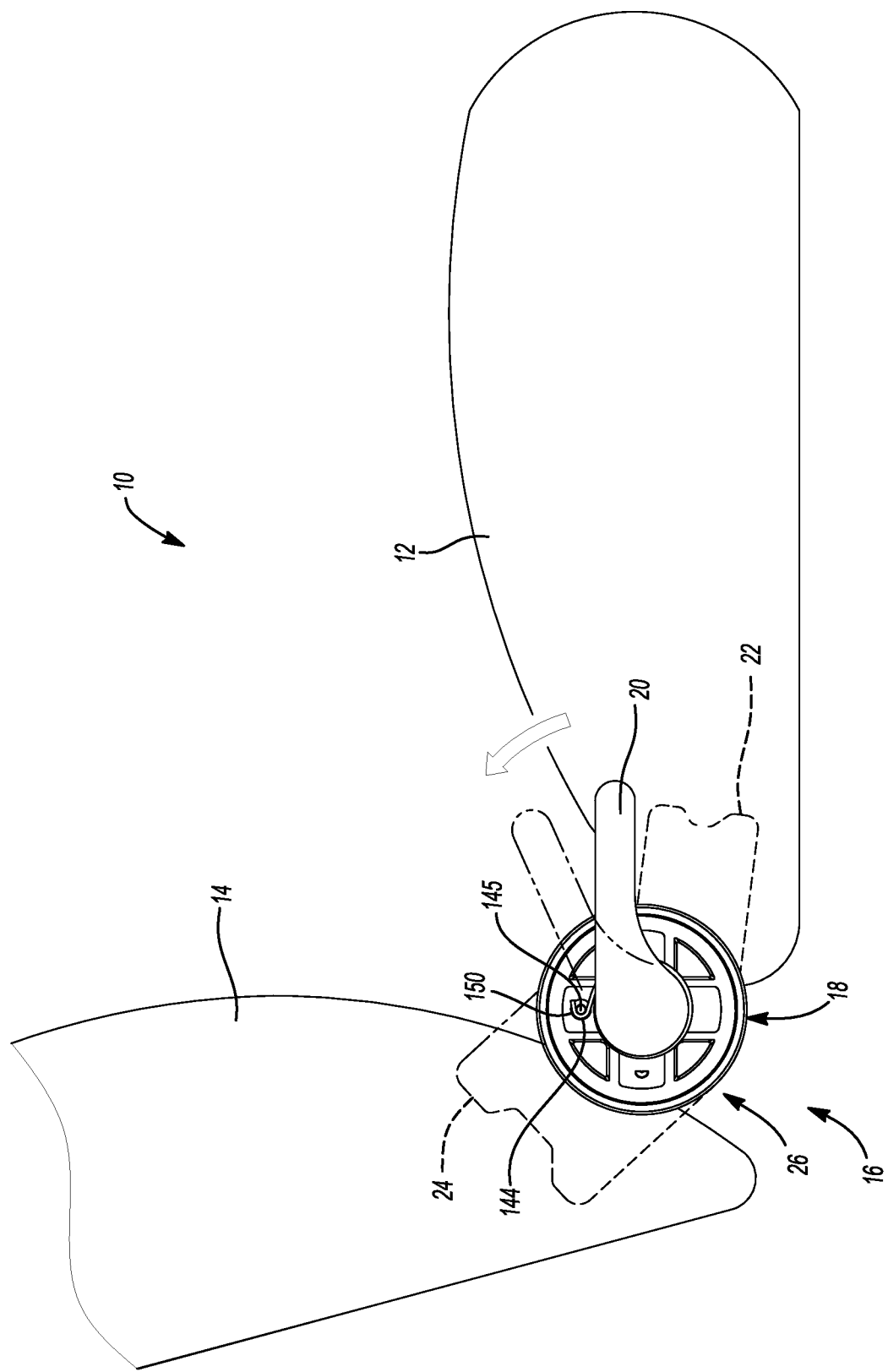
FIG. 1 is a partial side view of a vehicle seat assembly having a recliner mechanism according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle seat assembly 10 is provided that may include a seat bottom 12, a seatback 14 and a seat recliner assembly 16. The seat recliner assembly 16 is connected to the seat bottom 12 and the seatback 14 and can be actuated to allow movement of the seatback 14 relative to the seat bottom 12 among an upright position, a rearward reclined position and a forward dump position. The seat recliner assembly 16 may include a pair of recliner mechanisms 18 (only one of which is shown in FIG. 1), a hand or release lever 20 connected to one of the recliner mechanisms 18 and a cross member (not shown) extending between the recliner mechanisms 18.

Each recliner mechanism 18 may include a first bracket 22, a second bracket 24 and a recliner heart 26. The first and second brackets 22, 24 are mounted to the recliner heart 26. The first bracket 22 may be fixedly mounted to the seat bottom 12 and the second bracket 24 may be fixedly mounted to the seatback 14. The hand lever 20 can be rotated to move the recliner heart 26 between a locked position preventing relative rotation between the seatback 14 and the seat bottom 12 and an unlocked position permitting relative rotation between the seatback 14 and the seat bottom 12 among the upright position, the rearward position and the forward dump position.

Figure 2:
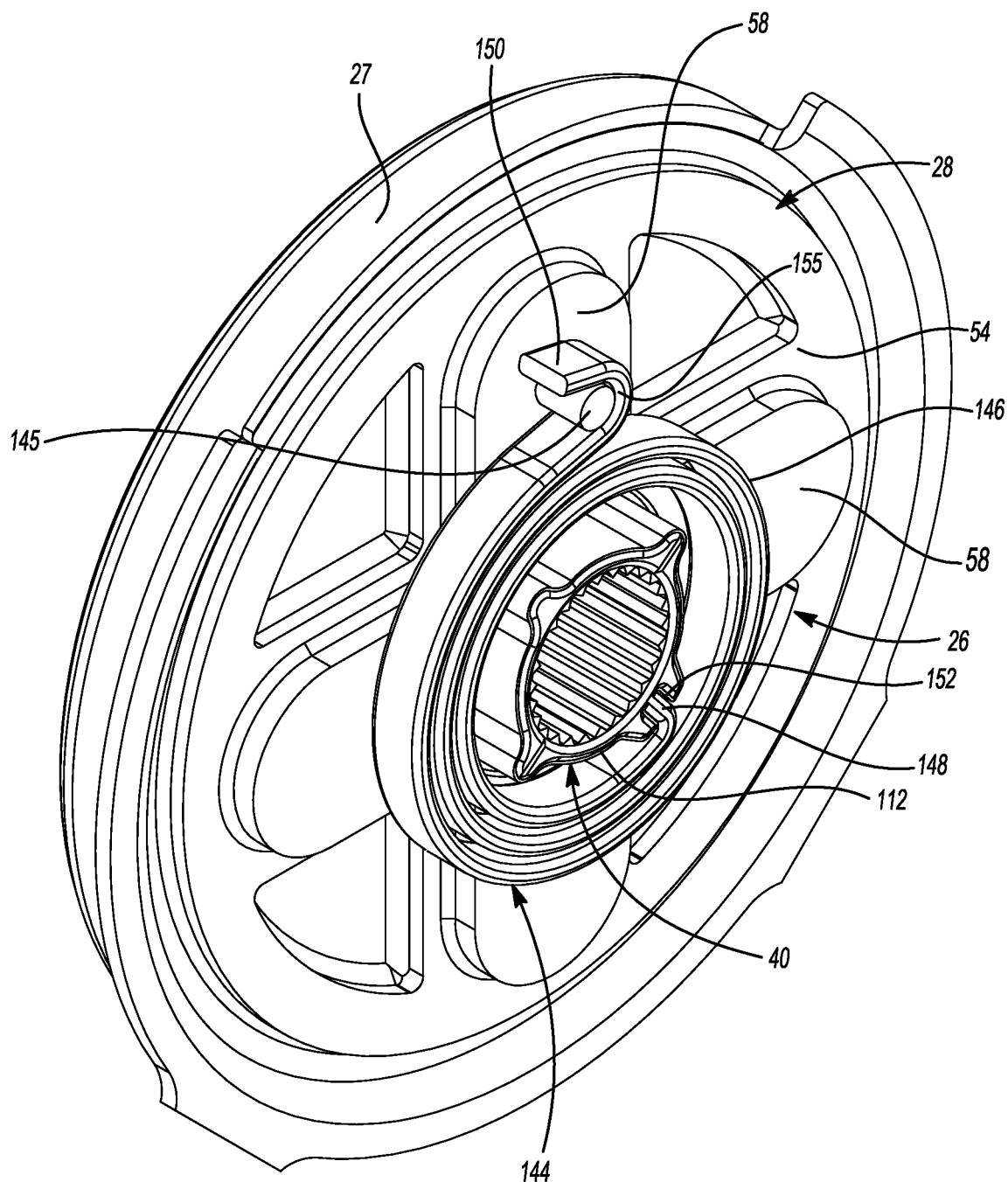
FIG. 2 is a perspective view of a recliner heart of the recliner mechanism of FIG. 1.
Figure 3:
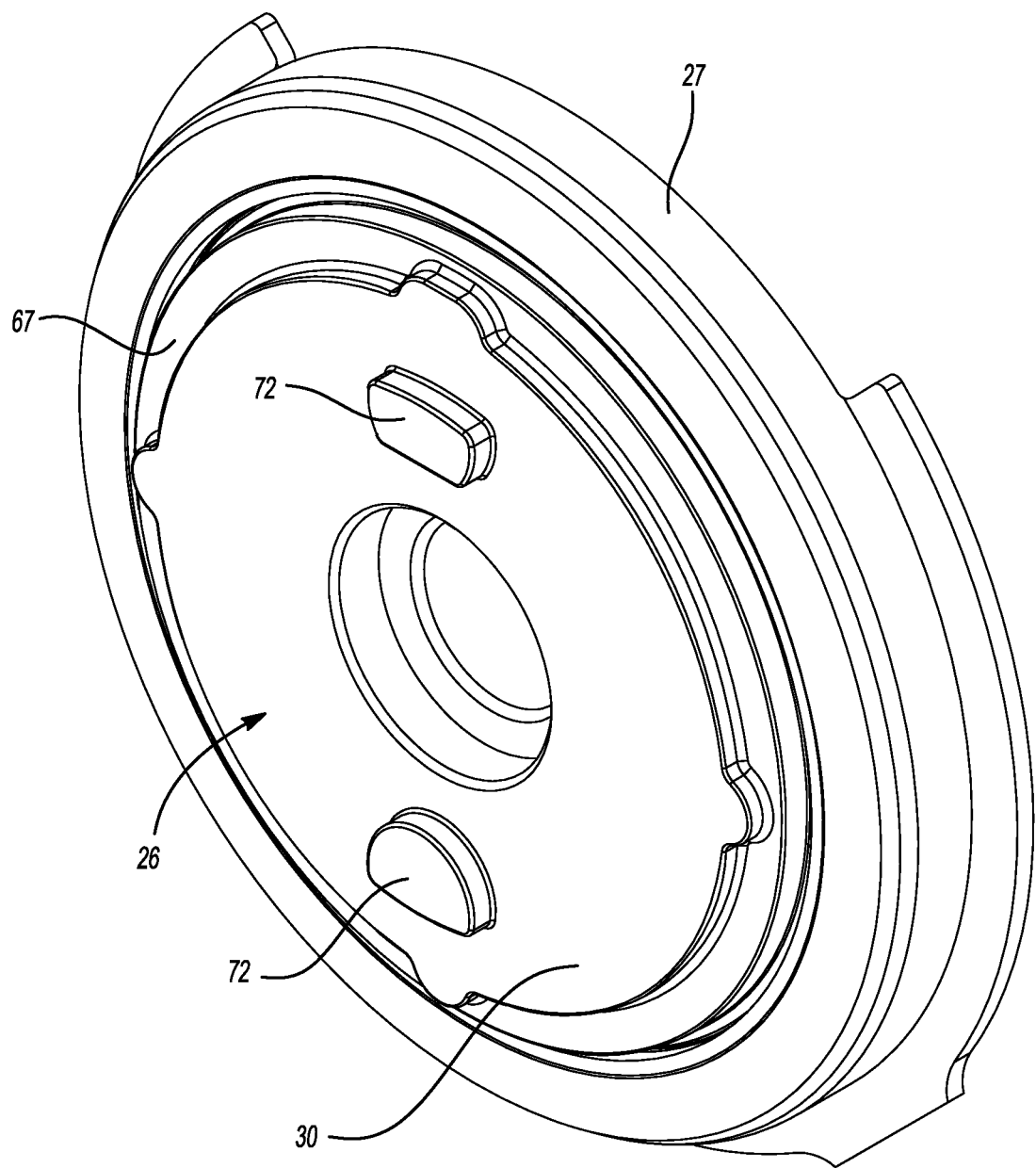
FIG. 3 is another perspective view of the recliner heart.

As shown in FIGS. 2 and 3, an encapsulation ring 27 may be attached (e.g., by welding) to the recliner heart 26 to hold the recliner heart 26 together and also to cover a periphery of the recliner heart 26, thereby preventing debris and fluid from infiltrating the recliner heart 26 and damaging its components. The recliner heart 26 may be a round recliner heart, for example.

Figure 4:
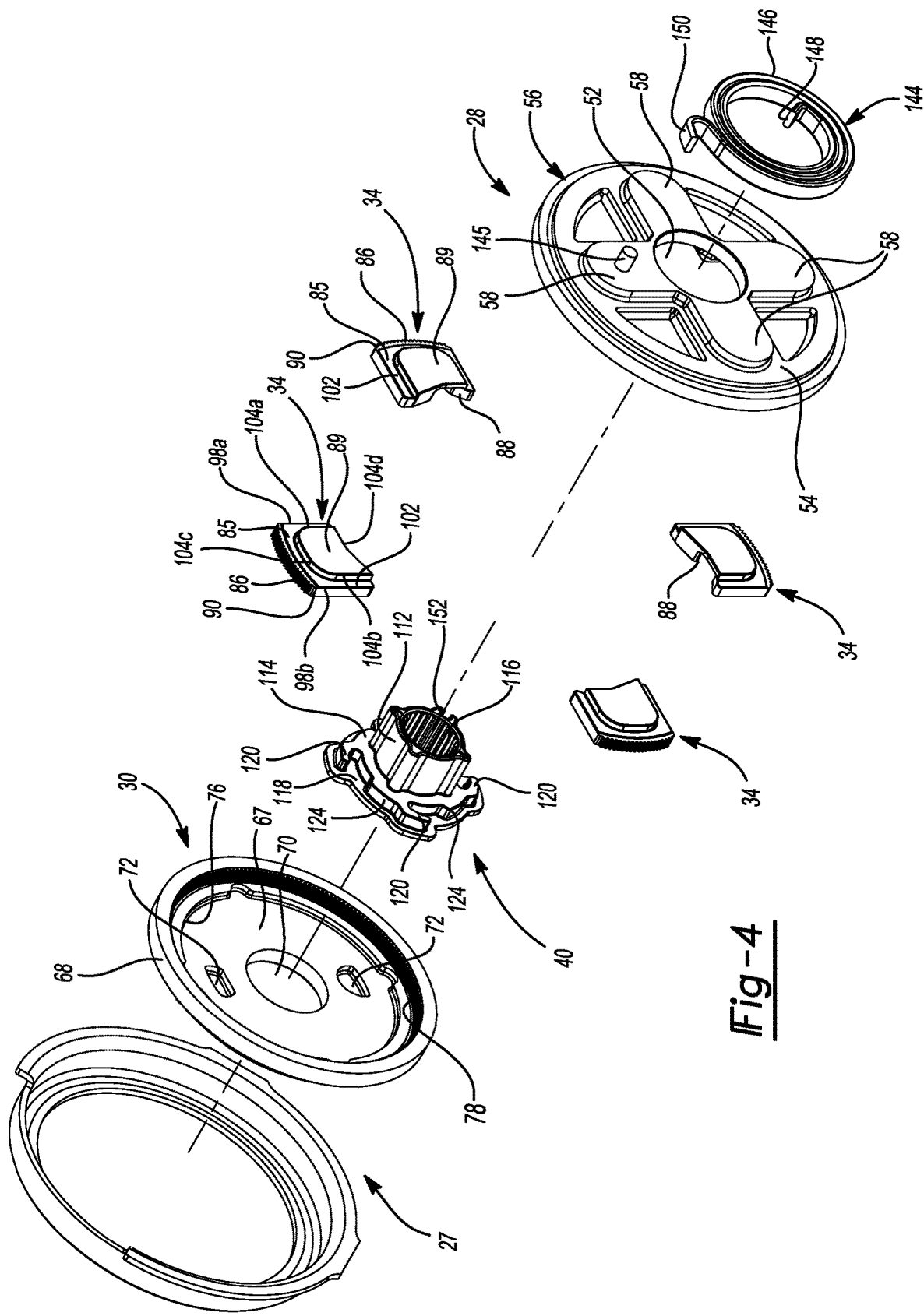
FIG. 4 is an exploded view of the recliner heart.
Figure 5:
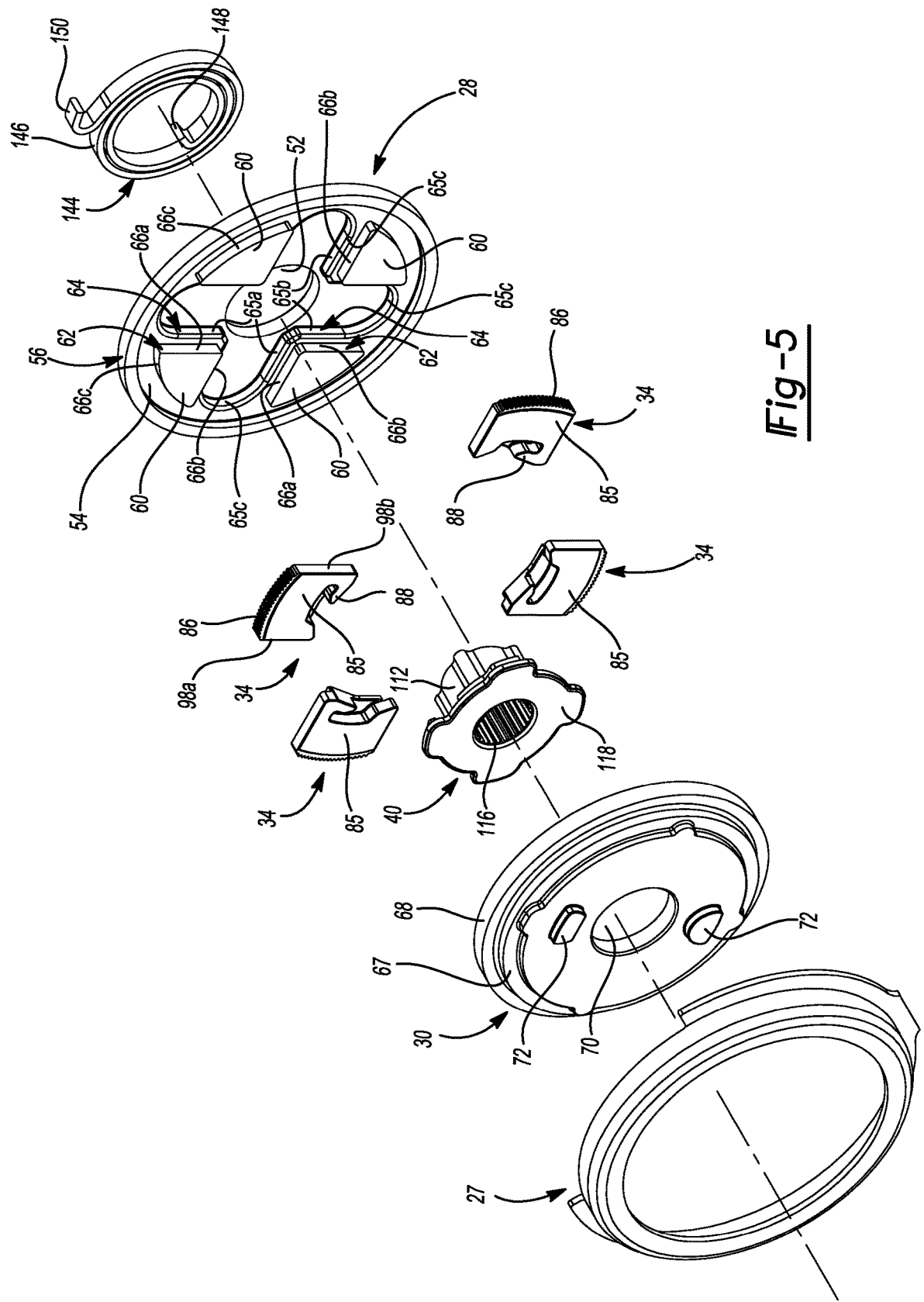
FIG. 5 is another exploded view of the recliner heart.

As shown in FIGS. 4 and 5, each recliner heart 26 may include a circular-shaped housing member or guide plate 28, a circular-shaped locking plate 30, a plurality of pawls 34 and an actuator hub 40.

The guide plate 28 and the locking plate 30 may cooperate to define a cavity in which the plurality of pawls 34 are disposed and in which the actuator hub 40 is at least partially disposed. The guide plate 28 may be rotationally fixed relative to the seat bottom 12 and may include an aperture 52, a plate surface 54 and a rim 56. As shown in FIGS. 4 and 5, the aperture 52 may extend through a center portion of the plate surface 54. The plate surface 54 may include a plurality of first protrusions 58 (FIG. 4), a plurality of generally triangular-shaped second protrusions 60 (FIG. 5) and first recesses 62 (FIG. 5).

The plurality of first protrusions 58 are disposed radially around the aperture 52 and extend from the plate surface 54, thereby forming second recesses 64 (FIG. 5). Each second recess 64 is disposed between two of the second protrusions 60 and has a first sidewall 65a, a second sidewall 65b, and a third sidewall 65c. The second recesses 64 are offset from the first recesses 62 in a direction parallel to an axis about which the guide plate 28 and the locking plate 30 are rotational relative to each other. The plurality of second protrusions 60 extend from the plate surface 54 opposite the direction of the plurality of first protrusions 58 and have a first sidewall 66a, a second sidewall 66b, and a third sidewall 66c. The sidewalls 66a, 66b are disposed between sidewalls 65a, 65b.

Each first recess 62 is disposed between two of the second protrusions 60 and is adjacent to a corresponding second recess 64. As shown in FIGS. 4 and 5, the rim 56 may extend 360 degrees around the periphery of the plate surface 54.

The locking plate 30 may be rotationally fixed to the seatback 14 and may include a plate surface 67 and a rim 68. The plate surface 67 may include an aperture 70 extending through a center portion thereof and a plurality of projections 72 extending from the plate surface 67 opposite the direction of the rim 68. The plurality of projections 72 may be received in corresponding apertures (not shown) of the second bracket 24 once the recliner heart 26 is mounted to the second bracket 24.

As shown in FIG. 4, the rim 68 may extend 360 degrees around a periphery of the plate surface 67 and may include an inner surface having a lobe 76 and teeth 78. The lobe 76 may extend radially inward from the inner surface of the rim 68 and may extend 360 degrees around the aperture 70. The teeth 78 may be adjacent to the lobe 76 and extend 360 degrees around the inner surface of the rim 68.

Figure 6:
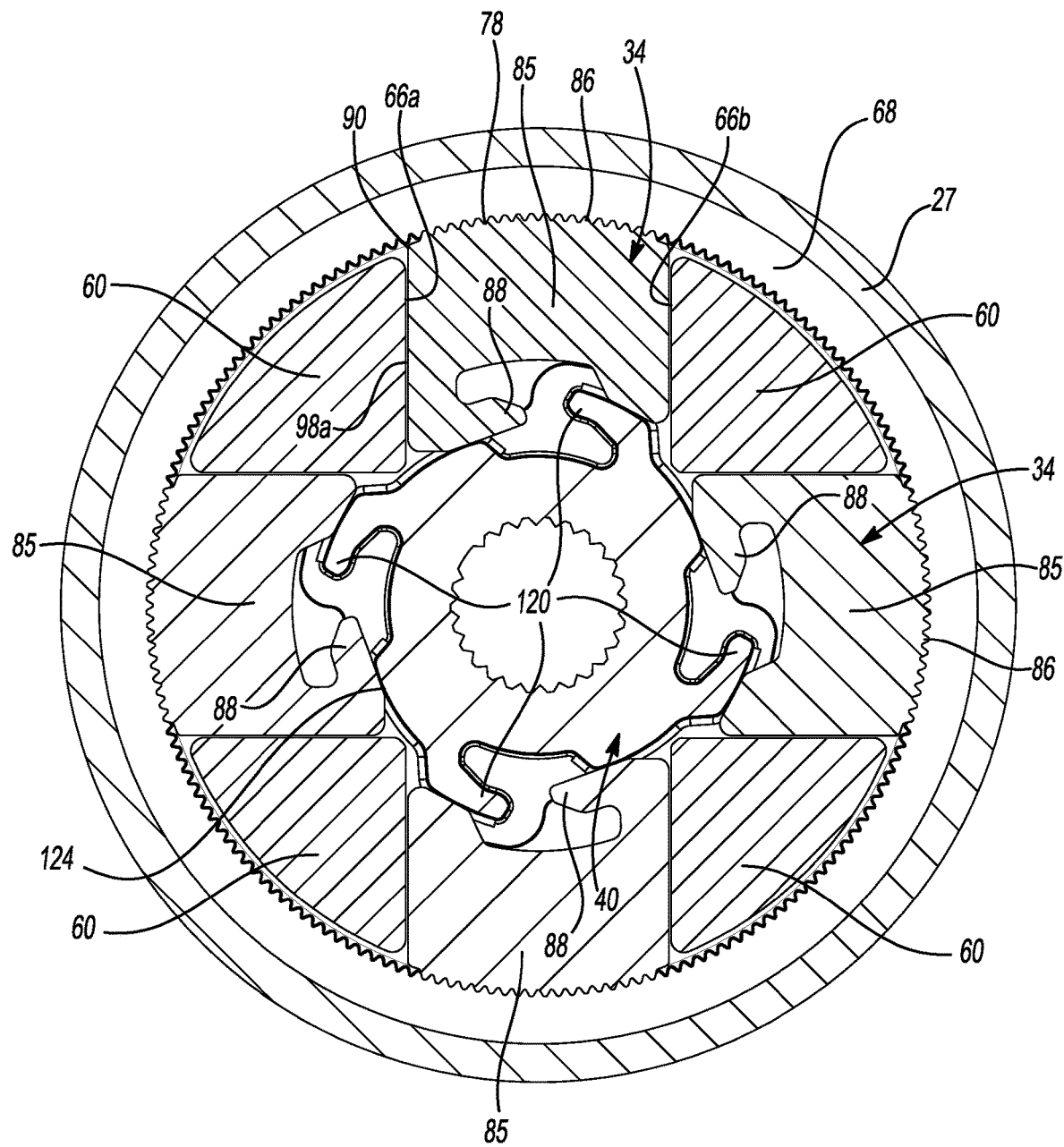
FIG. 6 is a cross-sectional view of the recliner heart in a locked position.

Each pawl 34 may be slidably received in a corresponding first recess 62 of the plate surface 54 between a secure position (FIG. 6) in which the pawl 34 is engaged with a portion of the teeth 78 of the locking plate 30 and a release position (FIG. 7) in which the pawl 34 is disengaged from the portion of the teeth 78 of the locking plate 30. Each pawl 34 may include a pawl portion 85 and a boss 89. The pawl portion 85 may include teeth 86 and a latch 88. The teeth 86 may be disposed at an edge 90 of the pawl 34 and may be adapted for meshing engagement with a portion of the teeth 78 of the locking plate 30 when the pawl 34 is in the secure position. The edge 90 may include a generally arcuate shape to improve engagement between the pawl 34 and the portion of the teeth 78 of the locking plate 30. The pawl portion 85 may also have opposing lateral sides 98a, 98b. The lateral side 98a may face the first sidewall 66a of one second protrusion 60 and the lateral side 98b may face the second sidewall 66b of another second protrusion 60.

Figure 7:
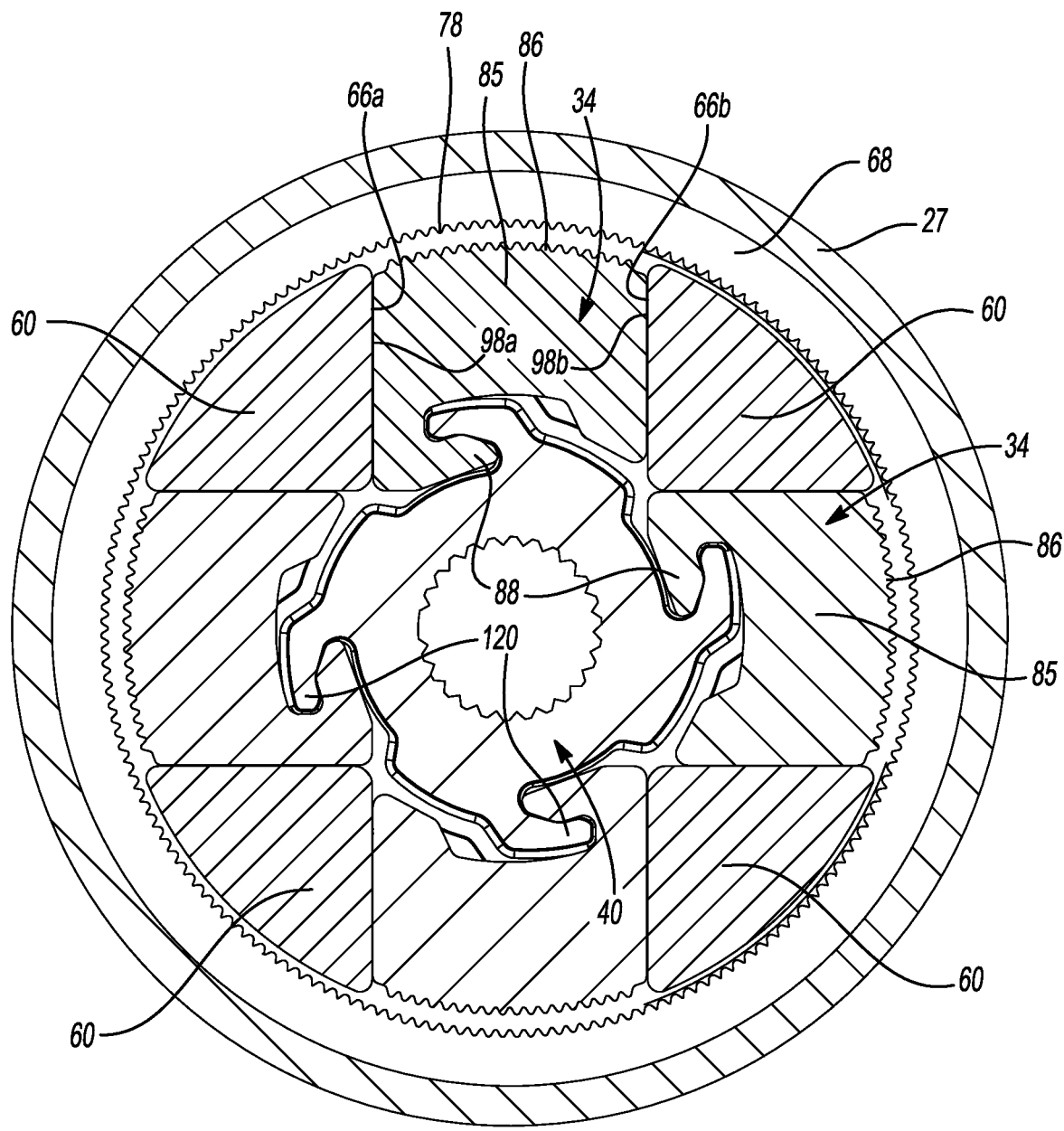
FIG. 7 is a cross-sectional view of the recliner heart in an unlocked position.

The boss 89 may extend from a surface 102 of the pawl portion 85 and may be slidably received in a corresponding second recess 64 of the plurality of first protrusions 58. As shown in FIGS. 4 and 7, the boss 89 may be asymmetrical and may include a plurality of sides (comprising of a first lateral side 104a, a second lateral side 104b, a third curved side 104c and an angled fourth side 104d). The first lateral side 104a and the second lateral side 104b extend parallel to each other and to the lateral sides 98a, 98b. The lateral sides 104a, 104b may also be disposed between the lateral sides 98a, 98b. The first lateral side 104a may face the first sidewall 65a of the second recess 64 and the second lateral side 104b may face the second sidewall 65b of the second recess 64. The first lateral side 104a may also be adjacent to the first sidewall 65a of the second recess 64 and the second lateral side 104b may be adjacent to the second sidewall 65b of the second recess 64.

The actuator hub 40 may include a shaft portion 112, a bushing portion 114, an opening 116 and a generally round disk portion 118. The shaft portion 112 may engage the hand lever 20 such that rotation of the hand lever 20 causes corresponding rotation of the actuator hub 40. The bushing portion 114 may include a plurality of radial latches 120 and a plurality of cam lobes 124. The radial latches 120 may selectively engage the latches 88 of the pawls 34 to move the pawls 34 into the release position. The opening 116 may extend through the shaft portion 112, the bushing portion 114 and the disk portion 118.

As shown in FIG. 2, the coil spring 144 may be attached to the shaft portion 112 of the actuator hub 40 and a post or projection 145 extending from the guide plate 28, and may rotationally bias the hand lever 20 and the recliner heart 26 toward the locked position. That is, the coil spring 144 rotationally bias the actuator hub 40 in a manner that causes the cam lobes 124 to force the pawls 34 outwardly to the secure position.

In the example shown in FIGS. 2, 4, and 5, the coil spring 144 includes a coiled section 146, a first end 148, and a second end 150. The coiled section 146 is coiled in a generally circular (or spiral) manner. The coiled section 146 surrounds (i.e., extends around) a periphery of the actuator hub 40. The first end 148 extends radially inward from the coiled section 146 and forms a hook or tab that is received in a slot 152 (FIG. 2) formed in the actuator hub 40. The second end 150 curls outward from the coiled section 146 and forms a hook that hooks onto the projection 145 of the guide plate 28 (i.e., the second end 150 loops partially around the projection 145). The projection 145 may be integrally formed with the guide plate 28. The guide plate 28 (including the projection 145) may be formed from a metallic material. The coil spring 144 may also be formed from a metallic material.

While the biasing force of the coil spring 144 acts to retain the first and second ends 148, 150 engaged with the slot 152 and projection 145, respectively, the second end 150 may be welded to the projection 145 to more securely retain the second end 150 on the projection 145. A weld 155 (FIG. 2) may be applied to the second end 150 and projection 145 at some or all of the points of contact between the second end 150 and the projection 145. The weld 155 between the second end 150 and the projection 145 prevents the spring 144 from disengaging the projection 145 during a vehicle crash or impact event.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner mechanism for a vehicle seat, the recliner mechanism comprising:
   a guide plate including a recess and a projection, wherein the recess is formed in a first side of the guide plate and the projection extends outward from a second side of the guide plate;
   a locking plate including a surface having teeth formed thereon;
   a pawl movable in the recess between a secure position in which the pawl is engaged with the teeth of the locking plate to restrict relative rotation between the guide plate and the locking plate and a release position in which the pawl is disengaged from the teeth of the locking plate to allow relative rotation between the guide plate and the locking plate;
   an actuator hub extending through an aperture in the guide plate and engaging the pawl such that rotation of the actuator hub relative to the guide plate causes corresponding movement of the pawl between the secure position and the release position; and
   a coil spring surrounding the actuator hub and rotationally biasing the actuator hub in a rotational direction that moves the pawl toward the secure position,
   wherein the coil spring includes a first end engaging the actuator hub and a second end that hooks the projection of the guide plate, and wherein the second end is welded to the projection.

2. The recliner mechanism of claim 1, wherein the second end of the coil spring extends outward from a coiled section of the coil spring.

3. The recliner mechanism of claim 2, wherein the first end of the coil spring extends radially inward from the coiled section.

4. The recliner mechanism of claim 3, wherein the first end of the coil spring is received in a slot in the actuator hub.

5. The recliner mechanism of claim 4, wherein the projection is integrally formed with the guide plate.

6. The recliner mechanism of claim 5, wherein the second end loops at least partially around the projection.

7. The recliner mechanism of claim 6, wherein the projection is a cylindrical post.

8. The recliner mechanism of claim 7, wherein the pawl is disposed between the guide plate and the locking plate, and wherein the coil spring is disposed on a side of the guide plate opposite the pawl.

9. The recliner mechanism of claim 8, wherein the actuator hub includes a radially extending latch that selectively engages a latch of the pawl to move the pawl into the release position.

10. The recliner mechanism of claim 9, further comprising a hand lever that drives the actuator hub, wherein the coil spring is disposed between the hand lever and the guide plate.

11. A vehicle seat comprising:
    a seat bottom;
    a seatback that is selectively rotatable relative to the seat bottom;
    a recliner mechanism connected to the seat bottom and the seatback and movable between a locked position to prevent rotation of the seatback relative to the seat bottom and an unlocked position to allow rotation of the seatback relative to the seat bottom, the recliner mechanism comprising:
       a guide plate including a recess and a projection, wherein the recess is formed in a first side of the guide plate and the projection extends outward from a second side of the guide plate;
       a locking plate including a surface having teeth formed thereon;
       a pawl movable in the recess between a secure position in which the pawl is engaged with the teeth of the locking plate to restrict relative rotation between the guide plate and the locking plate and a release position in which the pawl is disengaged from the teeth of the locking plate to allow relative rotation between the guide plate and the locking plate;
       an actuator hub extending through an aperture in the guide plate and engaging the pawl such that rotation of the actuator hub relative to the guide plate causes corresponding movement of the pawl between the secure position and the release position; and
       a coil spring surrounding the actuator hub and rotationally biasing the actuator hub in a rotational direction that moves the pawl toward the secure position,
       wherein the coil spring includes a first end engaging the actuator hub and a second end that hooks the projection of the guide plate, and wherein the second end is welded to the projection.

12. The vehicle seat of claim 11, wherein the second end of the coil spring extends outward from a coiled section of the coil spring.

13. The vehicle seat of claim 12, wherein the first end of the coil spring extends radially inward from the coiled section.

14. The vehicle seat of claim 13, wherein the first end of the coil spring is received in a slot in the actuator hub.

15. The vehicle seat of claim 14, wherein the projection is integrally formed with the guide plate.

16. The vehicle seat of claim 15, wherein the second end loops at least partially around the projection.

17. The recliner mechanism of claim 16, wherein the projection is a cylindrical post.

18. The vehicle seat of claim 17, wherein the pawl is disposed between the guide plate and the locking plate, and wherein the coil spring is disposed on a side of the guide plate opposite the pawl.

19. The vehicle seat of claim 18, wherein the actuator hub includes a radially extending latch that selectively engages a latch of the pawl to move the pawl into the release position.

20. The vehicle seat of claim 19, further comprising a hand lever that drives the actuator hub, wherein the coil spring is disposed between the hand lever and the guide plate.

\* \* \* \* \*